United States Patent [19]
Kato et al.

[11] Patent Number: 5,729,725
[45] Date of Patent: Mar. 17, 1998

[54] MASK DATA GENERATOR AND BIT FIELD OPERATION CIRCUIT

[75] Inventors: Koji Kato, Nagoya; Harutsugu Fukumoto, Anjo; Hiroaki Tanaka, Okazaki, all of Japan

[73] Assignee: Denso Corporation, Kariya, Japan

[21] Appl. No.: 733,734

[22] Filed: Oct. 17, 1996

[30] Foreign Application Priority Data

Oct. 19, 1995 [JP] Japan .................. 7-270894

[51] Int. Cl.$^6$ .................................................. G06F 7/00
[52] U.S. Cl. ........................................................ 395/565
[58] Field of Search ............................... 395/562, 564, 395/565, 800.22; 364/715.08, 736.5

[56] References Cited

U.S. PATENT DOCUMENTS

| | | | |
|---|---|---|---|
| 4,180,861 | 12/1979 | Armstrong et al. | 395/565 |
| 5,327,543 | 7/1994 | Miura et al. | 395/565 |
| 5,526,296 | 6/1996 | Nakahara et al. | 364/715.08 |
| 5,651,121 | 7/1997 | Davies | 395/376 |

FOREIGN PATENT DOCUMENTS

| | | |
|---|---|---|
| 58-192078 | 11/1983 | Japan . |
| 60-221826 | 11/1985 | Japan . |
| 63-278157 | 11/1988 | Japan . |
| 64-002986 | 1/1989 | Japan . |
| 2-039325 | 2/1990 | Japan . |
| 4-049415 | 2/1992 | Japan . |
| 5-150942 | 6/1993 | Japan . |

*Primary Examiner*—Parshotam S. Lall
*Assistant Examiner*—Viet Vu
*Attorney, Agent, or Firm*—Cushman, Darby & Cushman IP Group of Pillsbury, Madison & Sutro LLP

[57] ABSTRACT

With N-bit mask bit data, a bit mask generator generates (L×M×N)-bit mask data in which the N-bit mask bit data is disposed in one of L×M consistent blocks which is specified by M-bit block selection data and L-bit super-block selection data and each bit of the other blocks are stuffed with a stuffing bit. The bit mask generator comprises a first mask generator responsive to the block selection data for generating first mask data by disposing the N-bit mask bit data in one of M blocks of N bits which is specified by one of the M-bit block selection data, and a second mask generator responsive to the super-block selection data for generating the final mask data by disposing the first mask data in one of L super-blocks of M blocks which is specified by one of the L-bit super-block selection data. A bit field operation is performed by using the generated mask data.

8 Claims, 3 Drawing Sheets

MASK DATA GENERATOR AND BIT FIELD OPERATION CIRCUIT

BACKGROUND OF THE INVENTION

1. Field of the Invention

The present invention relates to a mask data generator for generating mask data of N bits from given mask bit data of n bits and a bit field operation circuit for performing a bit or bit field operation on an operand data of N bits with the mask data, and specifically to a mask generator for generating a N-bit mask data in which one of N/n constituent blocks consists of the given mask bit data and each bit of the other blocks are filled with a stuffing data, where N/n is a natural number which is not prime.

2. Description of the Prior Art

Japanese patent unexamined publication No. Hei5-150942 (1993) discloses a bit field operation circuit for use as arithmetic means within a microprocessor for processing graphic data such as moving pictures. In this prior art, a mask data generator locates given data of an arbitrary bit-length in an arbitrary position using a barrel shifter capable of shifting arbitrary bit-length data by an arbitrary number of bits to generate mask data. Using the mask data, a bit field operation can execute a Deposit instruction which replaces a part of data bit sequence with other data, an Extract instruction which extract a part of data bit sequence, etc.

However, in case of microprocessors used for control systems for controlling a machine for example, bit field operations necessary for controlling operation are generally limited to relatively simple operations in which a relatively small number of bits are involved. If such a mask data generator as described above is used for a microprocessor for control use, the mask data generator will be too much complicated and redundant for necessary bit field operations, causing the microprocessor to require an extra circuit area and extra cost. This will result in a larger size and a higher cost of a control system using such a mask data generator or bit field operation circuit.

SUMMARY OF THE INVENTION

It is therefore an object of the invention to provide a mask data generator, composed of fewer elements, for generating mask data for use in a bit field operation for a bit field of several bits and a bit field operation circuit incorporating the mask data generator.

In accordance with an aspect of the invention, with N-bit mask bit data and a stuffing bit given, a bit mask generator generates D-bit mask data in which the N-bit mask bit data is disposed in one of D/N consistent blocks which is specified by block selection data and super-block selection data and each bit of the other constituent blocks are stuffed with the stuffing bit, where N and D are such natural numbers that D/N is a natural number which is not prime. Since D/N is not a prime number, D/N can be resolved at least,into L×M, where L and M are natural numbers other than unity. Under this condition and further assuming that L<M, the bit mask generator comprises a first mask bit generator responsive to the block selection data of M bits for generating first mask data by disposing the N-bit mask bit data in one of M blocks of N bits which is specified by one of the M-bit block selection data and filling each bit of the other blocks with the stuffing bit, and a second mask bit generator responsive to the super-block selection data of L bits for generating the final mask data by disposing the first mask data of N×M bits in one of L super-blocks of M blocks which is specified by one of the L-bit super-block selection data and filling each bit of the other super-blocks with the stuffing bit.

The stuffing bit may be determined from a plurality of bits.

The block selection data and/or the super-block selection data may be obtained by decoding a plurality of data.

A bit field operation circuit may use a mask data generated by the above mask data generator to operate a bit field in one of L×M blocks of an operand data.

BRIEF DESCRIPTION OF THE DRAWINGS

Further objects and advantages of the present invention will be apparent from the following description of the preferred embodiments of the invention as illustrated in the accompanying drawings. In the drawings.

DETAILED DESCRIPTION OF THE PREFERRED EMBODIMENTS

Figure 1:
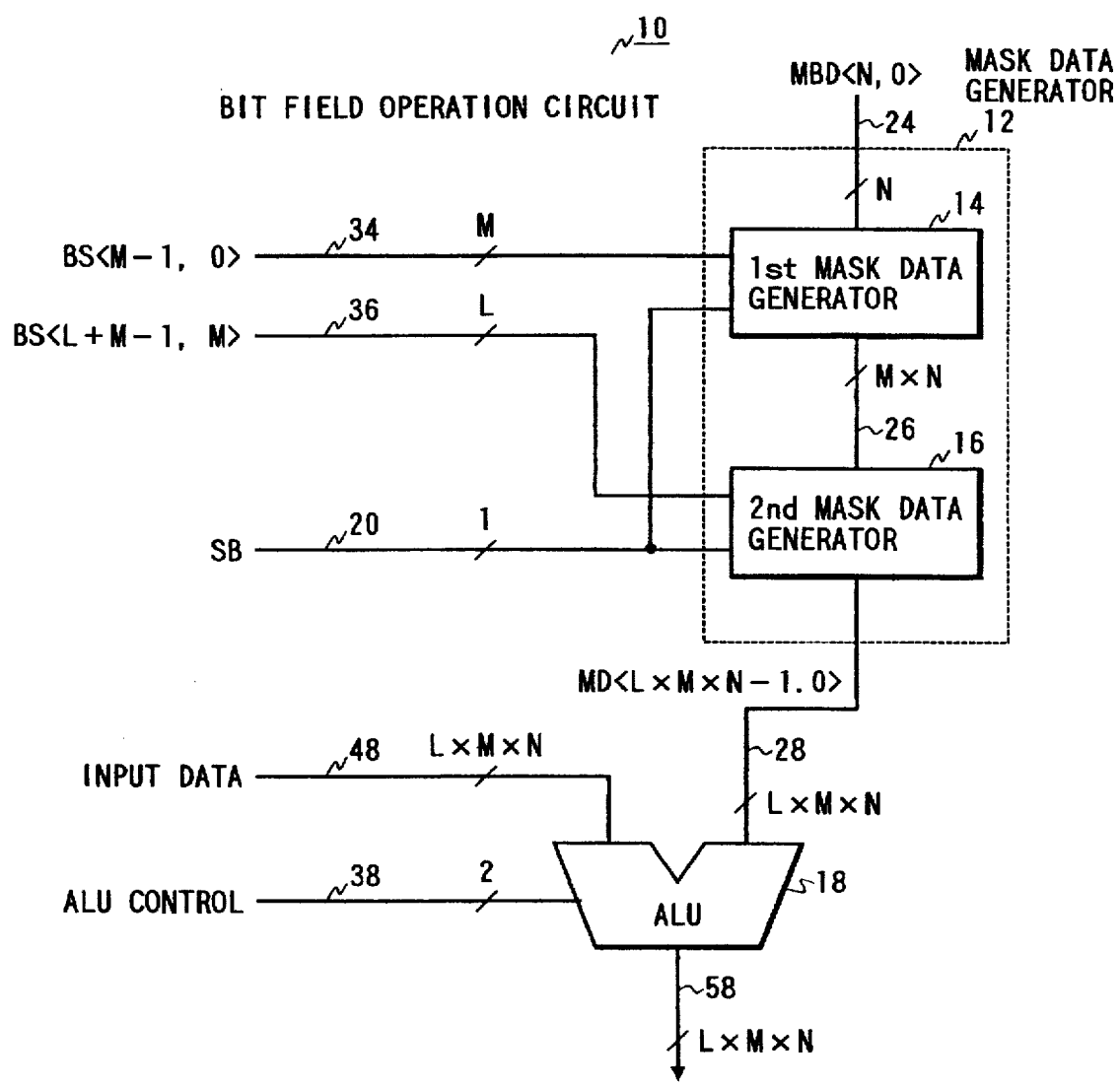
FIG. 1 is a block diagram showing an arrangement of a bit field operation circuit comprising a mask data generator according to the present invention.

FIG. 1 shows an arrangement of a bit field operation circuit comprising a mask data generator according to the present invention. In FIG. 1, the bit field operation circuit 10 comprises: a first mask data generator 14 having N data input lines 24, a stuffing data input line 20, M block selection data input lines 34, and M×N first mask data output lines 26; a second mask data generator 16 having the M×N first mask data output lines 26 and the stuffing data input line 20 connected thereto, and having L super-block selection data input lines 36, and L×M×N mask data output lines 28; and an arithmetic and logic unit 18 having the mask data output lines 28 connected thereto and having L×M×N data input lines 48, two ALU (arithmetic and logic unit) control lines 38 and L×M×N mask data output lines 58. The first and second mask data generators 14 and 16 constitute a mask data generator 12 as a whole.

Figure 2:
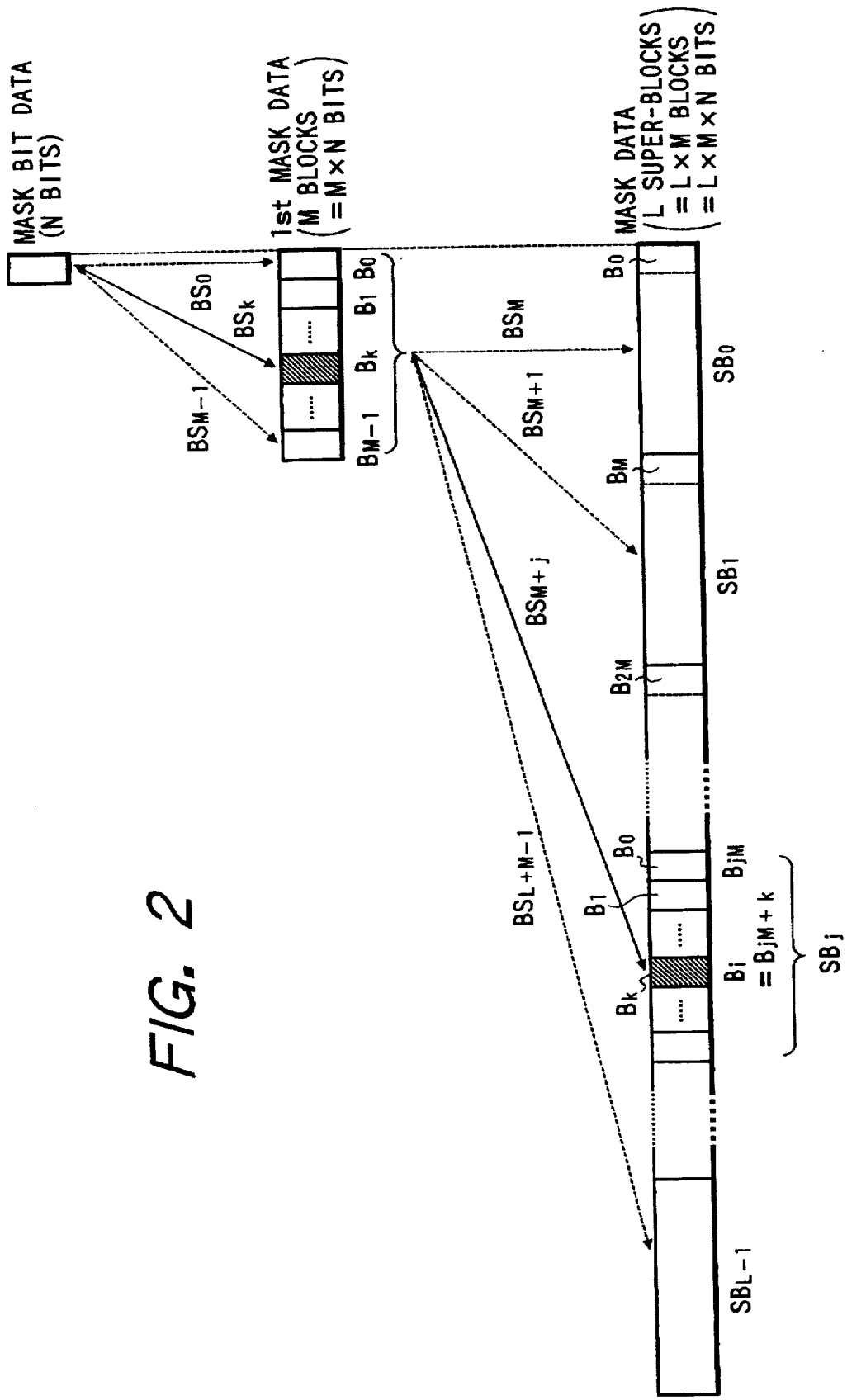
FIG. 2 is a diagram illustrating how the mask data generator generates mask data according to the invention.

FIG. 2 is a diagram showing how the mask data generator 12 generates mask data according to the invention. In this example, it is assumed that N-bit mask bit data is to be disposed in a i-th block of L×M blocks constituting operand data (or data to be processed), and i=M×j+k, where i=0,1, . . ., L×M−1, j=0,1, . . . , L−1 and k=0,1, . . . , M−1. In other words, the N-bit mask bit data is disposed in a k-th block in a j-th super-block.

Referring to FIGS. 1 and 2, operation in this case will be described in the following. N-bit mask bit data $MBD_N$, · · · $MBD_1$, $MBD_0$ (hereinafter, expressed en bloc like MBD<N, 0>) and a single bit stuffing data STB are supplied to the first mask data generator 14 via the mask bit data input lines 24 and the stuffing data input line 20, respectively. Lower M bits of mask bit positioning data or block selection data BS<M−1, 0> are input to the block selection data input lines 34. The block selection data BS<M−1, 0> correspond to M blocks generated by the first mask data generator 14 - - - $BM_{M-1}$, . . . , $B_1$, $B_0$, respectively, and are so arranged that only a block selection bit which corresponds to a selected block is 1 and the other bits are all 0's. Therefore, $BS_k=1$, and BS<M−1, k+1> and BS<k−1, 0> are all 0's in this example. Accordingly, the first mask data generator 14 fills a k-th block $B_k$ of the first mask data B<M−1, 0> with the N-bit mask bit data MBD<N, 0> as shown in FIG. 2 and stuffs each bit of the other blocks with the stuffing bit SB.

The first mask data B<M−1, 0> of M blocks (M×N bits) and the stuffing data STB are supplied to the second mask data generator 16 via the data line 26 and the stuffing data input line 20, respectively. Higher L bits of the mask bit positioning data or super-block selection data BS<L+M−1, M> are input to the super-block selection data input lines 36. The super-block selection data BS<L+M−1, M> correspond to L super-blocks generated by the second mask data generator 16—$SB_{L-1}$, ..., $SB_1$, $SB_0$, respectively, and are, again, so arranged that only a super-block selection bit which corresponds to a selected super-block is 1 and the other bits are all 0's. Therefore, $BS_{M+j}$=1, and BS<L+M−1, M+j+1> and BS<M+j−1, M> are all 0's in this example. Accordingly, the second mask data generator 16 fills a j-th super-block $SB_j$ of the L super-blocks $SB_{L-1}$, ..., $SB_1$, $SB_0$ with the M-block mask bit data B<M−1, 0> as shown in FIG. 2 and stuffs each bit of the other blocks with the stuffing bit STB to form mask data SB<L−1, 0>=B<L×M−1, 0>=MD<L×M×N−1, 0> of L super-blocks, L×M blocks or L×M×N bits.

The mask data MD<L×M×N−1, 0> is supplied to the ALU 18 via data line 28. (L×M×N)-bit operand data is input to the ALU 18 via the input data line 48. The ALU 18 also receives ALU control data of, e.g., 2 bits from the outside. In response to the ALU control data, the ALU 18 performs a logical operation on the input data with the supplied mask data MD<L×M×N−1, 0>. Hereinafter, a binary number and a hexadecimal number will be expressed by adding "B" and "H" after the end of the number, respectively. Values of the ALU control signals and the corresponding operations are, for example, as follows:

00B: AND

01B: OR, and

10B: EXOR,

It is noted that there is an instruction control unit (not shown) outside the bit field operation circuit 10 of FIG. 1. The instruction unit interprets a given instruction and supplies the above mentioned data to the bit field operation circuit 10.

Figure 3:
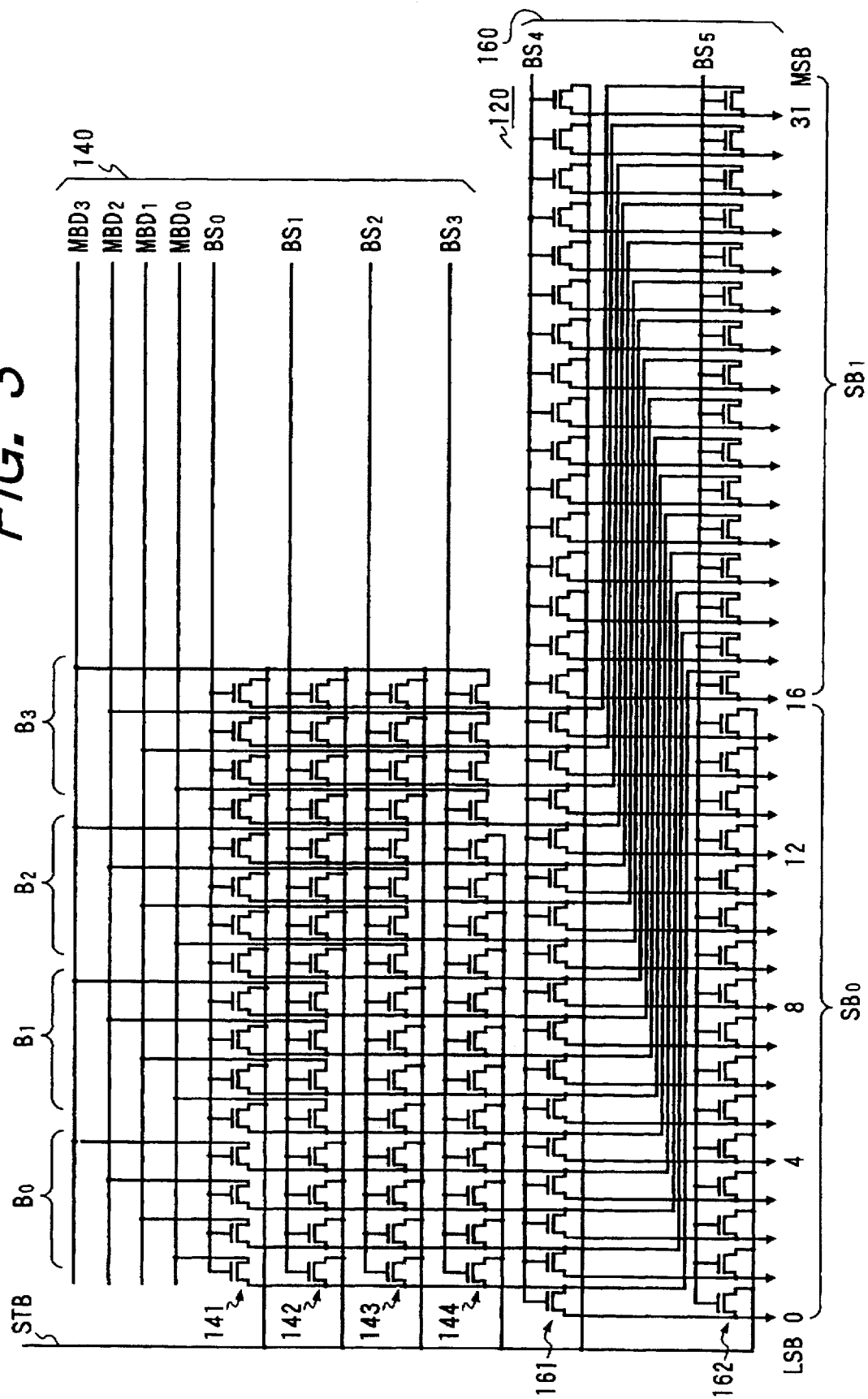
FIG. 3 is a diagram showing an illustrative embodiment of a mask bit generator according to the present invention.

FIG. 3 is a diagram showing an illustrative embodiment of a mask bit generator 120 for generating 32-bit mask data from given mask bit data of 4 bits according to the invention, of FIG. 1. For the purpose of simplicity of the description, it is assumed in FIG. 3 that N=4 and L×M×N=32. Since L×M=32/4=8, L and M are set for 2 and 4, respectively. In FIG. 3, the mask data generator 120 comprises a first mask data generator 140 shown in upper half of the figure and a second mask data generator 160 shown in lower half of the figure. The first mask data generator 140 comprises an array of NMOS-FETs (n-channel metal oxide semiconductor field effect transistors) of M rows by M×N column (M blocks of N bits), that is, 4 rows 141 through 144 by 4×4 column. The FETs of the FET row 141 have their gates connected in common with the least significant bit line $BS_0$ of the block selection data BS<M−1, 0> or BS<4, 0> (the M or 4 lower bits of the mask bit data positioning data). Similarly, each gate row of the FET rows 142 through 144 is connected with block selection lines $BS_1$ through $BS_3$, respectively.

The 0th through 3rd 4 bits or the bits of the block $B_0$ of the FET row 141 have their drains connected with 4 mask bit data $MBD_0$ through $MBD_3$. The 4th through 7th bits of the block $B_1$ of the FET row 142 have their drains connected with the 4 mask bit data $MBD_0$ through $MBD_3$. Similarly, the 8th through 11th bits of the block $B_2$ of the FET row 143 and the 12th through 15th bits of the block $B_3$ of the FET row 144 have their drains connected with the 4 mask bit data $MB_0$ through $MB_3$, respectively. The other drains of the FET rows 141 through 144 are connected with a stuffing bit line SB.

Also, the sources of each of the FET columns which correspond to each bit of the (M×N)-bit first mask data are connected in common to constitute an output line of the first mask data generator 140, which is connected to a data input terminal of the second mask data generator 160.

As seen from the above arrangement, if one of the block selection lines BS<3, 0>is selected, that is, becomes HIGH, the values of the drains of a FET row to which the selected block selection line is connected appears on the output lines of the first mask data generator 140. Thus, if a block selection line $BS_k$ is selected, than the N-bit mask bit data MBD<N−1, 0> is disposed in block $B_k$.

The second mask data generator 160 comprises, again, an array of NMOS-FETs of L rows by L×(M×N) column (L super-blocks of M blocks), that is, 2 rows 161 and 162 by 2×(4×4) column. The FETs of the FET row 161 have their gates connected in common with the least significant bit line $BS_4$ of super-block selection data BS<L+M−1, M> or BS<5, 4> (the L or 2 higher bits of the mask bit data positioning data). Similarly, the gate row of the FET row 162 is connected with super-block selection line $BS_5$.

As in the first mask data generator 140, the bits or FETs of j-th super-block $SB_j$ of j-th FET row to which a super-block selection line $BS_{M+j}$ have their drains connected with the (M×N)-bit first mask data as seen from FIG. 2 (j=0,1, ..., L−1). That is, the (M×N)-bit first mask data output from the first mask data generator 140 is connected to the drains of corresponding FETs of the super-block $SB_0$ (lower 16 bits) of the FET row 161 to which super-block selection line $BS_{4+0}$ or $BS_4$ is connected and the drains of corresponding FETs of the super-block $SB_1$ (higher 16 bits) of the FET row 162 to which super-block selection line $BS_{4+1}$ or $BS_5$ is connected. The other drains of the FET rows 161 and 162 are, again, connected with a stuffing bit line SB.

Also, the sources of each of the FET columns which correspond to each bit of the (L×M×N)-bit mask data are connected in common to constitute an output line of the second mask data generator 140, that is, the mask data generator 120.

As seen from the above arrangement, if one of the super-block selection lines BS<L+M−1, M>or BS<5, 4>is selected, that is, becomes HIGH, then the values of the drains of a FET row to which the selected block selection line is connected appears on the output lines of the (second) mask data generator 120 (140). Thus, if a super-block selection line $BS_j$ is selected, than the (M×N)-bit mask data MD<M×N−1, 0> is disposed in super-block $SB_j$ or MD<(j+1)M−1, ... jM> or MD<jM+M−1, jM> of the output mask data MD<L×M×N−1, 0>, that is, shifted by jM bits. The output mask data is coupled to the mask input of the ALU 18 through lines 28.

If BS<5, 4>=01B in the above arrangement, then the FETs of the FET row 161 are ON, the first mask data input to the second mask data generator 160 appear as they are without being shifted on the lower 16 bits MD<15, 0> of the mask data MD<L×M×N−1, 0> or MD<31, 0> output from the generator 160 (a through operation). If BS<5, 4>=10B, then the FETs of the FET row 162 are ON, the first mask data input to the second mask data generator 160 are shifted by 16 bits appearing on the higher 16 bits MD<L×M×N−1, 16> of the mask data MD<L×M×N−1, 0> or MD<31, 0> output from the generator 160 (a 16-bit shift operation).

Here, we discuss how the bit $OD_{23}$ of a 32-bit operand data OD<31, 0>=12345678H is set for "1" by using 4-bit mask bit data in the bit field operation circuit incorporating the just described mask data generator 120 (An operand data OD<31, 0> is a data to be subjected to a express the location of order to express the location of the 23rd bit of a 32-bit data in the manner shown in FIG. 2 or the block/super-block format, (23)/(M ×N)=23/16 is calculated to find a first quotient of 1 and a first remainder of 7. The first quotient corresponds to the super-block number (the subscript of the super-block) containing the bit in question. Further, 7/N=7/4 is calculated to find a second quotient of 1 and a second reminder of 3, which, correspond to the block number containing the bit in question and the bit number within the block with respect to the bit in question. Thus, the bit $OD_{23}$ is the bit No. 3 of $B_1$ of $SB_1$ in the OD<31, 0>.

As seen from the above description, the instruction control unit (not shown) supplies the bit filed operation circuit with the following control data:

mask bit positioning data: 100010B (=BS<5.0>), stuffing data: 0B, mask bit data: 1000B, and ALU control: 01B (OR).

Thus, the first mask data generator 140 is given the lower 4 bits of the mask bit positioning data or BS<3, 0>=0010B, and in response to this data, makes the $BS_1$ logical HIGH causing the FET row 142 to become conductive. Since the drains of the 4th through 7th bits of the FET row 142 are given the mask bit data 1000B, data 8H appears on the sources of the 4th through 7th bits of the FET row 142. The drains other than those of the 4th through 7th bits are given the stuffing data of "0." Accordingly, the first mask data generator 140 outputs a first mask data of 0080H in which 8H is given to the block $B_1$ to the second mask data generator 160.

The second mask data generator 160 is supplied with the upper 2 bits of the mask bit positioning data or BS<5, 4>=10B, and in response to this data, makes the $BS_5$ logical HIGH causing the FET row 162 to become conductive. Since the drains of the 15th through 0th bits of the FET row 162 is given the stuffing bit of 0 and the drains of the 31th through 16th bits of the FET row 162 are given the first mask data 0080H, the second mask data generator 160, that is, the mask data generator 120 outputs a mask data of 00800000H to the ALU 18.

Since the ALU 18 is given the ALU control data of 01B, the ALU 18 takes a logical OR of:

the operand data=12345678H, and the mask data=00800000H, yielding an output data of 12B45678H in which the bit No. 23 of the operand data has been set for "1."

It is now assumed that the bit field operation circuit 10 is supplied for a certain operand data with the following control data:

mask bit positioning data: 0100001B (=BS<5, 0>), stuffing data: 0B, mask bit data: 1111B, and ALU control: 00B (AND).

Then, this results in masking the operand data with a mask data of 0000000FH. That is, the upper 24 bits of the operand data are masked.

Though the present invention has been described in terms of an illustrative embodiment, it is apparent to those of ordinary skill in the art that other various arrangements may be constructed without departing from the spirit and scope of the present invention.

For example, though the stuffing data is described as a single bit data, the stuffing data may be given as an output of a logic circuit processing a plurality of bits. Similarly, a part or whole of the block selection data and the super-block selection data (which constitute as a whole mask bit positioning data) may be an output of a decoder circuit.

Also, a bit field operation circuit of the invention is not limited as shown in FIG. 1 and 3. For example, the block selection data lines BS<M−1, 0> or BS<3, 0> may be connected in the reverse order in the first mask data generator 14 or 140. The super-block selection data lines BS<L+M−1, M> or BS<5, 4> may be connected in the reverse order in the second mask data generator 16 or 160. A source and a drain may be reversed in each of the NMOS-FETs.

It should be therefore understood that the present invention is not limited to the specific embodiments described in the specification, but rather be construed broadly within its spirit and scope as defined by elements set out in the appended claims.

What is claimed is:

1. A mask data generator for generating mask data comprising L super-blocks each comprising M blocks of N bits for use in a bit field operation from mask bit data of N bits and a stuffing bit (L, M and N are natural numbers other than unity) wherein a block containing the mask bit data and a super-block containing said block is specified by block selection data BS<M−1, 0> and a super-block selection data BS<L+M−1, M>, the mask data generator comprising:

a first mask bit generator responsive to said block selection data for generating first mask data by disposing said mask bit data in one of said N blocks which is specified by said block selection data and filling each bit of the other blocks with said stuffing bit; and a second mask bit generator responsive to said super-block selection data for generating said mask data by disposing said first mask data in one of L super-blocks of M blocks which is specified by said super-block selection data and filling each bit of the other super-blocks with said stuffing bit.

2. A mask data generator as defined in claim 1, further comprising:

means for generating said stuffing bit from data comprising a plurality of bits.

3. A mask data generator as defined in claim 1, wherein:

each bit of said block selection data corresponds to a different one of said blocks; and only one bit of said block selection data takes a different value from those of the other bits of said block selection data.

4. A mask data generator as defined in claim 1, wherein:

each bit of said super-block selection data corresponds to a different one of said super-blocks; and only one bit of said super-block selection data takes a different value from those of the other bits of said super-block selection data.

5. A mask data generator as defined in claim 3, further comprising:

means for generating said block selection data by decoding data indicating the block in which said mask bit data is to be disposed in the form of a code.

6. A mask data generator as defined in claim 4, further comprising:

means for generating said super-block selection data by decoding data indicating the super-block in which said mask bit data is to be disposed in the form of a code.

7. A bit field operation circuit for performing a bit field operation using said mask data generated by a mask data generator as defined in any of claims 1 through 6.

8. A mask data generator for generating mask data comprising L super-blocks each comprising M blocks of N bits for use in a bit field operation from mask bit data of N bits and a stuffing bit (L, M and N are natural numbers other than unity) wherein a block containing the mask bit data and a super-block containing said block is specified by block selection data BS<M−1, 0> and a super-block selection data BS<L+M−1, M>, the mask data generator comprising:

a first mask data generator; and a second mask data generator, said first mask data generator comprising:

a first array of FETs of M rows by M×N column (M blocks of N bits);

M block selection data lines connected to gates of corresponding FET rows for selecting one of said blocks;

N mask bit data lines for receiving said mask bit data, each of said mask bit data lines being connected to drains of each of said blocks constituting each FET rows;

a stuffing data line connected to the drains of the FETs to which said mask bit data lines are not connected; and M×N output lines for outputting first mask data, each of said output lines being connected to sources of a different one of M×N FET columns, and said second mask generator comprising:

a second array of FETs of L rows by L×M×N column (L super-blocks of M blocks);

L super-block selection data lines connected to gates of corresponding FET rows for selecting one of said super-blocks:

M×N input lines for receiving said first mask data, each of said input lines being connected to drains of each of said super-blocks constituting each FET rows and said M×N output lines:

a stuffing data line connected to the drains of the FETs to which said input lines are not connected: and L×M×N output lines for outputting said mask data, each of said output lines being connected to sources of a different one of L×M×N FET columns.

* * * * *